Dec. 3, 1957    W. L. MORRISON    2,814,936
METHOD FOR LIQUEFYING NATURAL GAS AT CASING HEAD PRESSURE
Filed April 9, 1954
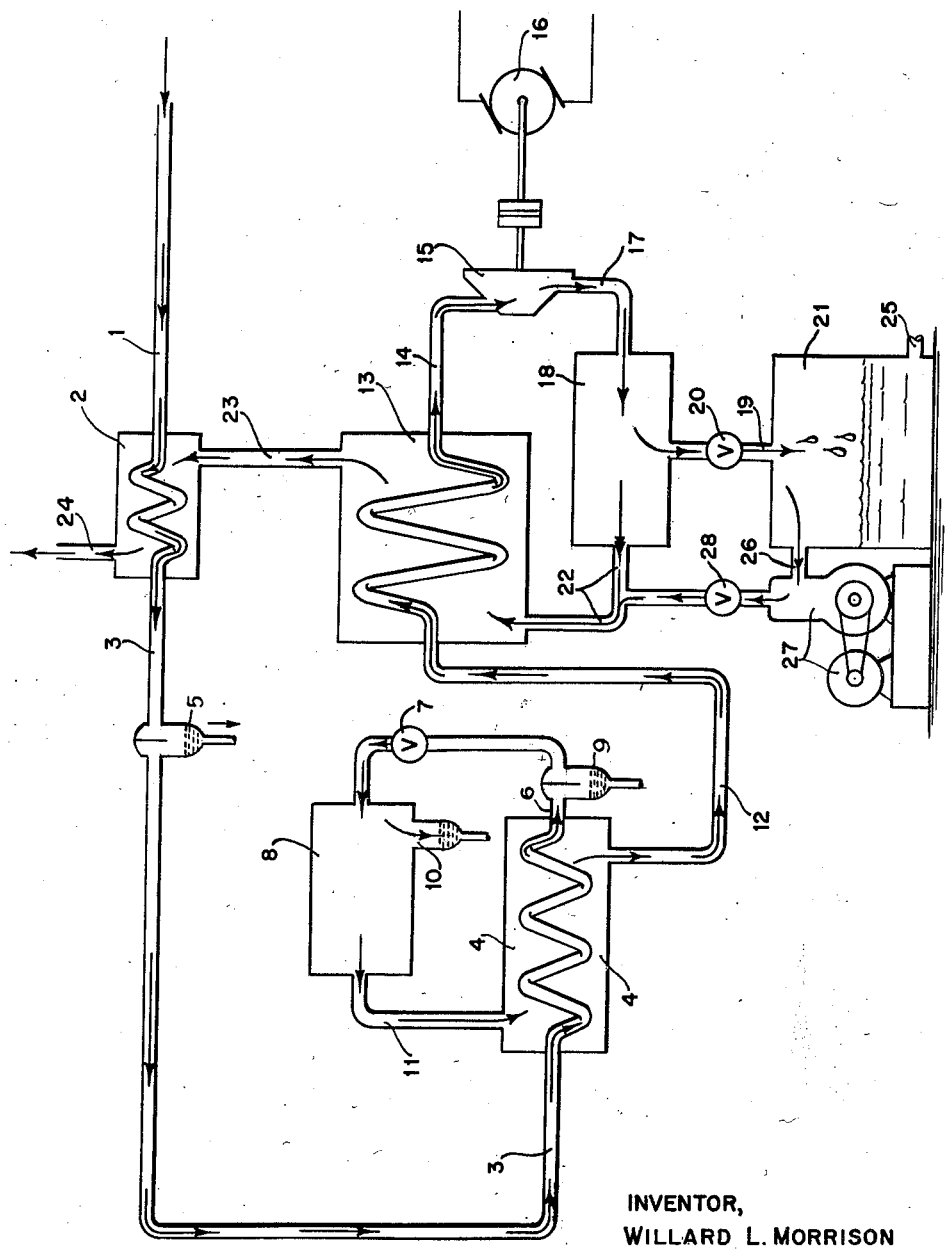
INVENTOR,
WILLARD L. MORRISON
ATTORNEY,
PARKER & CARTER

United States Patent Office 2,814,936
Patented Dec. 3, 1957

2,814,936

METHOD FOR LIQUEFYING NATURAL GAS AT CASING HEAD PRESSURE

Willard L. Morrison, Lake Forest, Ill., assignor, by mesne assignments, to Constock Liquid Methane Corporation, a corporation of Delaware Application April 9, 1954, Serial No. 422,138

10 Claims. (Cl. 62—175.5)

My invention relates to improvements in method and apparatus for liquefying natural gas. I propose to liquefy a portion of the gas entering my apparatus at high pressure, preferably, but not necessarily, directly from the well at casting head pressure, by reducing it to a temperature at which some of the gas remains liquid at atmospheric pressure. Natural gas is primarily methane mixed with relatively smaller quantities of water vapor and other gases which have different physical and chemical characteristics than methane. Since the gas to which the present invention is primarily directed is methane, the liquid must be reduced to a temperature not above approximately −258° F. for that is the temperature at which methane, the most intractable of all the elements of natural gas boils at atmospheric pressure.

In the present invention I propose to cause the gas at high pressure to expand, thus cooling the gas without doing any mechanical work. Such cooling will cause condensation as liquid of some of the other constituents of natural gas. Such liquids will be removed by draining after the reduction in temperature has caused their condensation. I propose then to expand the resultant gas down to a much lower pressure perhaps in the order of atmospheric pressure and as it expands it will be caused to do mechanical work. The resultant reduction of temperature down to approximately −258° F. will cause some of the methane to be condensed to a liquid which can then be drained off as a liquid at approximately −258° F.

After mechanical separation of the condensed liquid methane from the methane in gaseous phase, the remaining gas after heat exchange may be used in any desired method and for any desired purpose, the particular treatment and use of the gas after withdrawal of the cold, condensed liquid at −258° F. and after heat exchange forming no part of the present invention.

My invention is illustrated more or less diagrammatically in the accompanying drawing which is a diagrammatic layout and flow sheet illustrating my invention.

Like parts are indicated by like characters throughout the specification and drawing.

The numeral 1 indicates a high pressure pipe, preferably conducting natural gas for liquefaction at casing head pressure from the well, not here illustrated, though it it will be understood that gas at less than casing head pressure or gas from some other source may be used. The numeral 2 indicates a primary heat exchanger to which the high pressure gas is conducted by the pipe 1. The numeral 3 indicates a pipe leading from the primary heat exchanger 2 to an intermediate heat exchanger 4. The numeral 5 indicates a separator or drain chamber interposed between the ends of the pipe 3 which mechanically removes and discharges from the system any condensates condensing as a result of the cooling of the gas in the heat exchanger 2. Gas leaves the intermediate heat exchanger 4 through the duct 6 controlled by a throttle valve 7 and is discharged into an expansion tank 8, through any suitable expansion nozzle, the details of which form no part of the present invention and are not illustrated. The numeral 9 indicates a drain or mechanical separator which withdraws from the system any condensates condensed out from the gas as a result of the cooling of the gas in the heat exchanger 4. The gas expanding into the tank 8 is reduced in pressure and temperature without doing any mechanical work in accordance with the well known Joule Thompson effect. As a result, additional constituents of the gas will be condensed in the expansion tank 8 and may be discharged under suitable control from the apparatus through the drain pipe 10. The controls for the drains 5, 9 and 10 forming no part of the present invention are not illustrated. For convenience and clarity, I have illustrated the expansion tank and the heat exchanger separately though of course the expansion may take place equally well in a single housing.

The cold expanded gas, primarily methane, after such condensation has taken place, is discharged through the pipe 11 back to the intermediate heat exchange housing where the cold expanded gas cools the high pressure warmer gas on its way to the throttle valve 7.

The numeral 12 indicates a duct leading from the intermediate heat exchanger 4 to a pre-cooler heat exchanger 13. Thence the gas, much further reduced in temperature discharges through the pipe 14 to the expansion turbine 15 where the gas expands, being greatly reduced in temperature, does work and drives the turbine to generate power in the generator 16. The reduction in temperature resulting from the primary heat exchanger 2, the expansion tank and the pre-cooler heat exchanger 13 causes the gas as it enters the expansion turbine to be at a point far below its initial temperature so that the expansion of the gas through the turbine and the work there done is sufficient to reduce the temperature to a point such that some of the gas will become a liquid at the turbine exhaust pressure.

The exhaust gas from the turbine 15 passes through the duct 17 to the liquid separator 18. The liquid or liquefied part of the gas is discharged through the duct 19 controlled by valve 20 to any suitable receptacle 21. The cold gas, the liquefied portion having been withdrawn, travels from separator 18 through the duct 22 to the pre-cooler heat exchanger 13 where its temperature is raised by contact with the gas from the intermediate heat exchanger. This gas may then travel through the duct 23 to the primary heat exchanger and may be discharged therefrom as gas through a duct 24 for storage, transmission, use, or other treatment, as the case may be.

If the exhaust pressure of the turbine 15 is substantially at atmospheric pressure, then the liquefied methane separated out from the gas stream by the liquid separator 18 and discharged into the receptacle 21 may be stored, handled or shipped as the case may be at atmospheric pressure and approximately −258° F. and the receptacle 21 may and preferably will be insulated and used as the shipping or storage receptacle.

If, on the other hand, it is desired to have the exhaust pressure of the turbine 15 above atmospheric, so that pressure in the lines 22, 23, 24 being above atmospheric may be used to cause gas flow to any suitable other point of treatment or use, the pressure in the liquid separator 18 will also be above atmospheric and liquid will flow along the pipe 19 from the liquid separator 18 controlled by the valve 20 to the receptacle 21 from turbine exhaust pressure at atmospheric pressure will be further cooled and gas will be formed from a portion of the liquid in receptacle 21. Under these circumstances, the liquid phase will be drawn out through the drain 25 for further treatment, use, transmission or storage. The methane in the chamber 21 in gaseous phase being below the pressure in the pipe 22 will be drawn through the pipe 26 to the motor driven compressor 27 which will discharge the gas through the check valve 28 to the pipe 22 for discharge thereto at pressure not less than the pressure therein. The check valve 28 prevents escape of gas from pipe 22 in reverse flow back to the motor driven compressor 27, the check valve permitting flow only from the compressor 27 to the duct 22.

It is desirable in order to get an adequate amount of the gas in liquid phase as a result of the expansion and work done in the turbine that the initial temperature of the gas as it enters the turbine be substantially below the casing head or initial temperature and this is accomplished by the expansion and by two of the heat exchangers indicated above though under some circumstances the primary heat exchanger might be omitted.

It may also be desirable that most of the constituents of natural gas other than methane be removed so that when the temperature of the gas is reduced deposit of liquid or solids, condensed out of the gas will not occur in sufficient quantity to prevent operation. Therefore, the liquid concentrates are drained off after passage of the gas through each of the first two heat exchangers.

The progressive drop in temperature of the gas in the primary heat exchanger and in the expansion tank is such that those constituents of the gas which are likely to condense and form obstructions to gas flow throughout the system are removed. It will be understood, of course, that natural gas is a complicated material having many elements the boiling point or point of condensation of which varies but by the arrangement shown any of the constituents of the gas which are left in the gas as it leaves the expansion tank 8 are of such character and in such quantity that dangerous condensation or deposit will not take place.

In the following example I have set out operative and satisfactory temperatures and pressures but I want it understood that they are purely illustrative and the pressures and temperatures may easily and properly be varied in consonance with the design of the apparatus, the character of the gas and the conditions under which it is to be liquefied or used or treated.

In the example selected the casing head or initial pressure of the natural gas which is, as above stated, predominantly methane, may be for example, 2000 p. s. i. a. and the temperature at which it enters my apparatus may be 85° F. As the gas passes through the initial heat exchanger it will be reduced in temperature to approximately 60° F. and as it passes through the intermediate heat exchanger its temperature will be further reduced to approximately 40° F. There may and probably will be condensation of some of the constituents of the gas as a result of the cooling in each heat exchanger and therefore drains are provided to remove such liquid condensates from the stream of gas. Any reduction in pressure of the gas as a result of the cooling, condensation and removal of condensates can be disregarded.

The gas then at approximately 40° F. and 2000 p. s. i. a expands in the expansion tank to 1000 p. s. i. a. and —7° F. This much greater reduction in pressure and temperature will result in further condensation of some of the constituents of the gas, which will be separately discharged.

The gas then passes through the intermediate heat exchanger, cools the gas on its way to the expansion tank and is warmed thereby to 20° F. at approximately 1000 p. s. i. a This gas then passes through the pre-cooler where it is cooled to —80° F. and then expands in the turbine, doing work and is discharged therefrom at —225° F. and 55 p. s. i. a This low pressure gas as it passes through the pre-cooler, cools the gas on its way to the turbine and is warmed thereby so that it will be discharged from the pre-cooler at 10° F. and then will pass through the primary heat exchanger cooling the gas from the source and will be raised thereby to 50° F. The pressure of the gas from turbine exhaust to discharge from the system will be substantially constant at 55 p. s. i. a.

In the example given with the turbine exhaust above atmospheric pressure the liquefied gas and some of the gas in gaseous stage passing through the control valve will expand in the receiver to 14.7 p. s. i. a. and —258° F., the temperature at which methane can remain in liquid phase. The motor driven compressor returning gas in gaseous phase from the receiver to the system will add some heat but the relatively small quantity of gas being returned on the downstream side of the liquid separator will cause no important change in temperature of the gas discharged from the liquid separator and can be disregarded.

The cooling of the gas in the intermediate heat exchanger, its expansion through the expansion tank and its passage through the intermediate heat exchanger on its way to the pre-cooler exerts no appreciable thermodynamic change in the cycle. It is advantageous, however, because it makes possible at this point in a very simple and effective way to sharply reduce the temperature of the gas to more effectively condense and permit removal from the gas stream those deleterious elements which might otherwise condense in the pre-cooler and the turbine and interfere with the operation of the apparatus. In this illustration with respect to the intermediate heat exchanger the calculations were made in consideration of the change in specific heat of the gas at different pressures.

Assuming that there is discharged from the well, or otherwise supplied to my apparatus 100,000 standard gas cubic feet per minute which is discharged through and does work in the turbine there will be developed 3400 horsepower and there will be discharged as liquid from the liquid separator 20,000 standard gas cubic feet per minute of methane and other fractions in liquid phase. There will be at the same time discharged from my system 80,000 standard gas cubic feet per minute in gaseous phase disregarding of course the relatively small amount of other constituents of the gas which were removed before the gas reaches the pre-cooler.

I have illustrated the intermediate heat exchanger and its expansion tank as separate structures. Obviously the expansion tank and the heat exchanger vessel can equally well be the same housing. All that is necessary is that provision be made for withdrawal of condensate, for control of the rate of expansion and for the necessary intimate heat exchange between the expanded cooler gas and the unexpanded warmer gas.

I claim:

1. The method of liquefying natural gas which consists in supplying it in gaseous phase to a liquefying system at relatively high pressure and temperature, cooling it, expanding the cooled gas in an expansion chamber with resultant further reduction of temperature to liquefy the higher boiling condensates leaving a product containing practically all of the original methane in the natural gas in a gaseous state, removing the condensate, cooling the separated expanded gas, causing it to expand and do work, recovering the resultant liquefied gas and discharging the remaining dry gas from the system.

2. The method of liquefying natural gas which consists in supplying it in gaseous phase to a liquefying system at relatively high pressure and temperature, causing it to expand in an expansion chamber therein, with resultant reduction of temperature to liquefy the higher boiling condensates leaving a product formed chiefly of methane in a gaseous phase, separating the condensate from the remainder, cooling the separated expanded gas, causing it to expand and do work, recovering the resultant liquefied gas and discharging the remaining dry gas from the system.

3. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, cooling the gas, causing it to expand with external work to a pressure and temperature at which at least some of the natural gas is liquefied, separating the resultant liquid and gas, using the separated gas by heat exchange to cool the gas which is about to expand and do external work.

4. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, cooling the gas, causing it to expand with external work to a pressure and temperature at which at least some of the natural gas is liquefied, separating the resultant liquid and gas.

5. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, using the expanded gas by heat exchange to cool the high pressure gas before it is caused to expand, cooling the gas, causing it to expand with external work to a pressure and temperature at which at least some of the natural gas is liquefied, separating the resultant liquid and gas, using the separated gas by heat exchange to cool the gas which is about to expand and do external work.

6. The method of liquefying gas which consists in supplying it in gaseous phase to a liquefying system at well pressure and temperature, cooling it by heat exchange, removing resultant concentrates, cooling it again by heat exchange and removing resulting concentrates, expanding it in an expansion chamber with resultant reduction in pressure and removing the resultant concentrates, using the expanded gas by heat exchange to cool the gas before expansion in the chamber, cooling the expanded gas and causing it to expand and do work with resultant drop in temperature sufficient to liquefy some of the gas, recovering and storing some of the liquefied gas and discharging the resultant dry gas for use as fuel.

7. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, cooling the gas, causing it to expand with external work to a pressure and temperature at which at least some of the natural gas is liquefied, separating the resultant liquid and gas, at the pressure and temperature resulting from the expansion with external work, in a separation zone, expanding the liquid and some of the gas into a recovery zone at reduced pressure for final recovery of the liquid, withdrawing gas from the recovery zone, raising its pressure up to the pressure resulting from the expansion of the gas with external work and discharging such compressed gas with the gas discharged from the separation zone, using the separated gas by heat exchange to cool the gas which is about to expand and do external work.

8. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, cooling the gas, causing it to expand with external work to a pressure and temperature at which at least some of the natural gas is liquefied, separating the resultant liquid and gas, at the pressure and temperature resulting from the expansion with external work, in a separation zone, expanding the liquid and some of the gas into a recovery zone at reduced pressure for final recovery of the liquid, withdrawing gas from the recovery zone, raising its pressure up to the pressure resulting from the expansion of the gas with external work and discharging such compressed gas with the gas discharged from the separation zone.

9. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, using the expanded gas by heat exchange to cool the high pressure gas before it is caused to expand, cooling the gas, causing it to expand with external work to a pressure and temperature at which at least some of the natural gas is liquefied, separating the resultant liquid and gas, at the pressure and temperature resulting from the expansion with external work, in a separation zone, expanding the liquid and some of the gas into a recovery zone at reduced pressure for final recovery of the liquid, withdrawing gas from the recovery zone, raising its pressure up to the pressure resulting from the expansion of the gas with external work and discharging such compressed gas with the gas discharged from the separation zone as a separated gaseous phase, using the separated gaseous phase by heat exchange to cool the gas which is about to expand and do external work.

10. The method of liquefying natural gas which consists in supplying it in gaseous phase to a liquefying system at relatively high pressure and temperature, cooling the gas, causing it to expand in a first expansion step without external work to a pressure and temperature at which the natural gas remains in gaseous phase while other constituents condense, removing condensates from the gas, using the expanded gas by heat exchange to cool the high pressure gas before it is caused to expand, cooling the gas, causing it to expand with external work to a pressure and temperature at which at least some of the natural gas is liquefied, separating the resultant liquid and gas, at the pressure and temperature resulting from the expansion with external work, in a separation zone, expanding the liquid and some of the gas into a recovery zone at reduced pressure for final recovery of the liquid, withdrawing gas from the recovery zone, raising its pressure up to the pressure resulting from the expansion of the gas with external work and discharging such compressed gas with the gas discharged from the separation zone.

References Cited in the file of this patent

UNITED STATES PATENTS

| | | |
|---|---|---|
| 1,320,168 | Paris | Oct. 28, 1919 |
| 1,497,546 | Claude | June 10, 1924 |
| 1,696,558 | Van Nuys | Dec. 25, 1928 |
| 1,939,696 | Hasche | Dec. 19, 1933 |
| 2,601,599 | Deming | June 24, 1952 |
| 2,617,484 | Swearingen | Nov. 11, 1952 |

FOREIGN PATENTS

| | | |
|---|---|---|
| 77,177 | Germany | July 25, 1919 |